(12) United States Patent
Stein et al.

(10) Patent No.: US 9,335,219 B2
(45) Date of Patent: May 10, 2016

(54) DUAL WAVEBAND TEMPERATURE DETECTOR

(75) Inventors: Alexander Stein, Secaucus, NJ (US); Francesco Pompei, Cambridge, MA (US)

(73) Assignee: Exergen Corporation, Watertown, MA (US)

(*) Notice: Subject to any disclaimer, the term of this patent is extended or adjusted under 35 U.S.C. 154(b) by 1031 days.

(21) Appl. No.: 13/351,882

(22) Filed: Jan. 17, 2012

(65) Prior Publication Data
US 2012/0183013 A1    Jul. 19, 2012

Related U.S. Application Data (63) Continuation-in-part of application No. 13/151,900, filed on Jun. 2, 2011, now abandoned.

(60) Provisional application No. 61/397,077, filed on Jun. 7, 2010.

(51) Int. Cl.
*G01K 7/00* (2006.01)
*G01J 5/60* (2006.01)

(52) U.S. Cl.
CPC ........................................ *G01J 5/60* (2013.01)

(58) Field of Classification Search
CPC ......... G01J 5/60; G01J 5/602; G01J 205/604; G01J 2005/607
USPC ........................... 374/120–121, 161, 130–132
See application file for complete search history.

(56) References Cited

U.S. PATENT DOCUMENTS 2,302,554 A * 11/1942 Kingsbury ...................... 356/43
3,654,809 A * 4/1972 Worden et al. ................. 374/127
3,759,102 A * 9/1973 Murray .......................... 374/123
3,817,622 A * 6/1974 Billman et al. .................. 356/73
4,831,258 A * 5/1989 Paulk et al. .................... 250/349
5,764,684 A   6/1998 Pompei

OTHER PUBLICATIONS

© Exergen Corp., "How the Lo E Filter Reduces Errors Due to Emissivity Variations," Handbook of Non-Contact Temperature Sensors, The IRt/c™ Book Third Edition, 92-93 (1996).
© Exergen Corp., "Two-Color Pryometry with IRt/c's," Handbook of Non-Contact Temperature Sensors, The IRt/c™ Book Third Edition, 115 (1996).

* cited by examiner

*Primary Examiner* — Lisa Caputo
*Assistant Examiner* — Janice M Soto
(74) *Attorney, Agent, or Firm* — Hamilton, Brook, Smith & Reynolds, P.C.

(57) ABSTRACT

There are many industrial applications in which non-contact temperature sensing is useful for increasing production speed and quality, such as printing, laminating, extrusion, and metal forming. Disclosed is a non-contact temperature determining apparatus which uses two wide wavelength bands integrating sensors to determine the radiance ratio of a target and thereby determine a corresponding temperature of the target. Also disclosed is a non-contact temperature determining apparatus in which a beam splitter passes one wide wavelength band to a sensor and reflects another distinct wide wavelength band to another sensor from which temperature can be determined. A disclosed embodiment of the dual waveband temperature detector improves upon traditional and currently available ratio pyrometers by further reducing the cost of the system, making installation and use easier, and improving temperature detection for low temperature industrial applications.

40 Claims, 7 Drawing Sheets

| CONTROL TEMP (°F) | D501 IR THERMOMETER (°F) | | SENSOR-1 (mV) | | SENSOR-2 (mV) | |
|---|---|---|---|---|---|---|
| | D501 UN-PAINTED | D501 PAINTED | S1 UN-PAINTED | S1 PAINTED | S2 UN-PAINTED | S2 PAINTED |
| 231.1 | 140.6 | 215.4 | 0.345 | 1.949 | 0.268 | 1.443 |
| 295.0 | 182.6 | 289.2 | 0.623 | 3.279 | 0.617 | 3.457 |
| 350.0 | 210.0 | 324.5 | 0.632 | 3.697 | 0.781 | 4.526 |
| 423.6 | 257.7 | 395.4 | 0.783 | 5.001 | 1.400 | 8.236 |
| 350.0 | 202.3 | 326.3 | 0.575 | 3.627 | 0.772 | 4.548 |
| 295.0 | 198.1 | 280.3 | 0.507 | 2.903 | 0.507 | 2.883 |
| 231.1 | 154.9 | 215.4 | 0.344 | 1.887 | 0.257 | 1.368 |
| 166.0 | 127.4 | 160.3 | 0.183 | 1.043 | 0.111 | 0.580 |

| RADIANCE RATIO (Ws2/Ws1) | |
|---|---|
| UN-PAINTED | PAINTED |
| 0.78 | 0.74 |
| 0.99 | 1.05 |
| 1.24 | 1.22 |
| 1.79 | 1.65 |
| 1.34 | 1.25 |
| 1.00 | 0.99 |
| 0.75 | 0.72 |
| 0.61 | 0.56 |

| EMISSIVITY RATIO | |
|---|---|
| S1 | S2 |
| 5.6 | 5.4 |
| 5.3 | 5.6 |
| 5.8 | 5.8 |
| 6.4 | 5.9 |
| 6.3 | 5.9 |
| 5.7 | 5.7 |
| 5.5 | 5.3 |
| 5.7 | 5.2 |

DUAL WAVEBAND TEMPERATURE DETECTOR

RELATED APPLICATIONS

This application is a continuation-in-part of U.S. application Ser. No. 13/151,900, filed Jun. 2, 2011 now abandoned, which claims the benefit of U.S. Provisional Application No. 61/397,077, filed on Jun. 7, 2010. The entire teachings of the above applications are incorporated herein by reference.

BACKGROUND OF THE INVENTION

A pyrometer is a device that intercepts and measures thermal radiation in a non-contact temperature sensing process known as pyrometry. A typical pyrometer has an optical system and detector; the optical system focuses thermal radiation onto the detector. The detector produces an output signal, typically a voltage, which is related to thermal radiation, or iridescence, of a target object. Therefore, the output signal of the detector can be used to infer the temperature of the target object, while negating the need for direct contact between the temperature detecting device and the target object.

The thermal radiation of an object depends on its emissivity. Emissivity is the property of a material's surface that describes its "efficiency" at emitting thermal radiation. An emissivity value of 1.0 represents thermal radiation emission at 100% while an emissivity of 0 describes thermal radiation emission at 0% (or perfect reflection).

Typically, for non-metals and coated metals emissivity is very high, 0.8 or greater, and variations in emissivity are less of a problem for non-contact temperature detection. For example, a production process in which a non-metallic material with an emissivity of 0.9 is to be temperature-controlled, and if normal material variations cause emissivity variations of ±0.01, the associated temperature error will be of the order of 0.01 divided by 0.9, or about 1% of the temperature reading, an acceptable variation for many applications. In contrast, for a production process in which the temperature of a metal having an emissivity of 0.2 must be controlled, emissivity variations of ±0.01 will produce an error on the order of 0.01 divided by 0.2, or about 5% of the temperature reading, which is typically unacceptable. Additionally, metal finishes, which play a significant role in emissivity, tend to have more variations than non-metals. A common problem is aluminum because its emissivity is low and variable due to alloying, surface oxidation, variations in surface finish, and other factors.

Ratio pyrometers typically use two photo sensors to detect radiation at two separate wavebands. Temperature can be determined by taking the ratio of the detected radiation. Traditional ratio pyrometers, which date from about the middle of the last century, operate with two narrow spectral bands. As such, they are successful at measuring targets of strong radiance. In other words, they are useful for measuring high temperature targets. However, for targets with lower temperatures, and therefore a lower radiance, the narrow spectral bands receive insufficient photo signals, rendering the technique useless.

U.S. Pat. No. 5,764,684, titled "Infrared Thermocouple Improvements," issued Jun. 9, 1998, discloses a device and method which employs infrared sensors with very wide bandwidths, thereby increasing the radiation detector output, such that relatively low temperatures (i.e., less than 50° Celsius (C.)) can be measured. Further disclosed is the side-by-side placement of a short wavelength low emissivity infrared (IR) thermocouple and a long wavelength infrared thermal couple focused on the same target area at a particular distance. The two thermocouple input channels provide input to a computer or PLC. The computer or PLC has the computational ability to solve two equations with two unknowns, with one such solution being the computation of differentials in signal relative to the initial calibration. This solution depends on the assumption that the emissivity ratio remains constant for the two wavebands of interest.

SUMMARY OF THE INVENTION

An embodiment of the presented dual waveband temperature detector improves upon conventional two-color pyrometry systems by further reducing system costs, improving ease of installation and use, and particularly for improving temperature detection for low temperature industrial applications (i.e., temperatures less than 500° Fahrenheit (F.) or 260° Celsius (C.)), which has not been practical for conventional two-color pyrometry.

Prior art two-color pyrometry systems used a side-by-side configuration of a short wavelength low emissivity IR thermocouple and a long wavelength IR thermocouple, where the low emissivity IR thermocouple and a long wavelength IR thermal couple are both focused on the same target area at a particular distance. Such a configuration can cause inherent engineering difficulties, such as parallax error, increasing the difficulty of the installation and use of the device. An embodiment of the presented dual waveband temperature detector uses a beam splitter to superimpose the optical axes of both sensors; eliminating parallax errors and improving ease of installation and use.

Another feature of an example embodiment of the dual waveband temperature detector enables non-contact detection of low temperature targets and reduces two-color pyrometer costs. The use of wide bandwidth components enables the sensors to capture more thermal energy than traditional narrow bandwidth two-color pyrometers. By enabling more energy to be captured with a wide range of wavelengths, which include longer wavelength energy, lower energy targets (i.e., lower temperature and longer wavelength emitting targets) can be accurately detected. Further, by enabling more energy to be captured, less costly optical and electronic components can be used without sacrificing performance.

According to an example embodiment of a temperature detector, a dual waveband temperature detector apparatus, and corresponding method for non-contact temperature sensing, includes a beam splitter, first and second sensors, and electronics to provide an output representative of the detected surface temperature of a target.

A further example embodiment of a radiation detector includes first and second wideband integrating sensors, and electronics to compute the ratio of the integrated signals and provide an output. The output can be representative of the detected surface temperature of a target.

A further alternative example embodiment includes a beam splitter, first and second radiation integrating sensors, and electronics to provide an output representative of the detected surface temperature of a target.

The beam splitter can be made of sapphire, which has transmission characteristics in which wavelengths of less than about 5 microns ($\mu m$) are passed through and wavelengths of greater than about 5 $\mu m$ are reflected. The first radiation integrating sensor can cover a wide wavelength range including less than or equal to about 5 $\mu m$, and the second integrating sensor can cover a wide wavelength range including greater than or equal to about 5 $\mu m$.

The electronics can compute a ratio of the detected radiation, which can indicate the temperature of a target. The window of the first sensor can be made of the same material as the beam splitter. The first and second radiation integrating sensors can be thermopiles configured so that they share a common heat sink, which can be formed of aluminum, to maintain the cold junctions at a common temperature. The dual waveband temperature detector can further include a lens, which can be a Fresnel lens.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The invention in general relates to pyrometry and more particularly to two-color pyrometry.

There are many applications in which non-contact temperature sensing is useful, such as for increasing production speed and quality of industrial processes. Example industrial applications include printing, laminating, extrusion, and metal forming. Traditional infrared (IR) temperature detection methods are difficult to implement for many applications because of inherent engineering problems. However, two-color pyrometry yields significant improvements over the single wavelength devices traditionally used for IR temperature detection, and therefore, eliminates most of the difficulties associated with such devices.

Many of the drawbacks of conventional two-color pyrometry systems, such as size, complexity, and cost, have been improved upon with the recent improvements in the field; however, the current two-color pyrometry systems can be further improved. An example embodiment of the dual waveband temperature detector does so by further reducing the cost of the system, making installation and use easier, and improving temperature detection for low temperature (i.e., less than 500° Fahrenheit (F.) or 260° C.) industrial applications.

Traditional ratio pyrometers measure the thermal radiance at two narrow wavelength bands and calculate the temperature from the ratio of these radiances, particularly when the emissivity $\epsilon$ is unknown. Such devices are typically used for metals at high temperatures, where the emitted energy is intense and at short wavelengths, often in the visible range. Typically, wavelength bandwidths $\partial\lambda/\lambda$ less than or equal to 0.01 are considered to be narrow bandwidth, while those equal to or greater than 0.1 are considered to be wide bandwidth.

An embodiment of the current invention, by utilizing wide wavelength bands, can further reduce the cost of ratio pyrometry systems while accurately monitoring a range of low temperatures for industrial applications. Using wide wavelength bands enables the sensors to capture more energy than narrow wavelength bands sensors. Because more energy is capture by the wide waveband sensors, the requirements for front-end electronics, such as amplifiers and analog-to-digital (A/D) converters, can be reduced. This enables a reduction in the cost of the apparatus. Furthermore, by utilizing wide wavelength bands, rather than narrow wavelength bands, it is possible to capture more energy with the wide wavelength band sensor at longer wavelengths, and, therefore, to accurately monitor the low temperatures typical of industrial applications.

By integrating the energy over a wide wavelength band, the requirement that the emissivity ratio be constant over all wavelengths is relaxed. What is required for accuracy, in an embodiment of the present invention, is that the ratio of the detected energy integrated over the two wavebands be constant, which is a more flexible requirement than that of maintaining a constant emissivity ratio over all wavelengths. Accordingly, the target does not have to have the properties of a "gray body," which is the assumption that emissivity is constant as a function of wavelength.

Many of the currently available ratio pyrometers still suffer from inherent engineering difficulties, making them less reliable and more difficult to use than example embodiments of the dual waveband temperature detector presented herein. Often, these currently available ratio pyrometers have two sensors that are mounted side-by-side, configured so that both focus on one target measurement spot at one particular distance. At any distance other than the designed target distance, the optical axes of the two sensors do not focus on the same point, and, therefore, measure the radiance of two separate target spots. This is called a parallax error and it limits the usefulness of current approaches. Similarly, any partial obstruction, such as smoke, dust, or moisture, of the optical field of only one of the two sensors has the potential to cause errors because the radiance measure by the partially obstructed sensor will be reduced.

An embodiment of the current invention superimposes both optical axes by means of a beam splitter (also known as a beam combiner) to always have both sensors aimed at the same target spot regardless of the target distance. Further, because the two sensors simultaneously use the identical optical field, any partial obstruction affects both sensors identically. Therefore, any errors due to partial blockage are eliminated.

Figure 1:
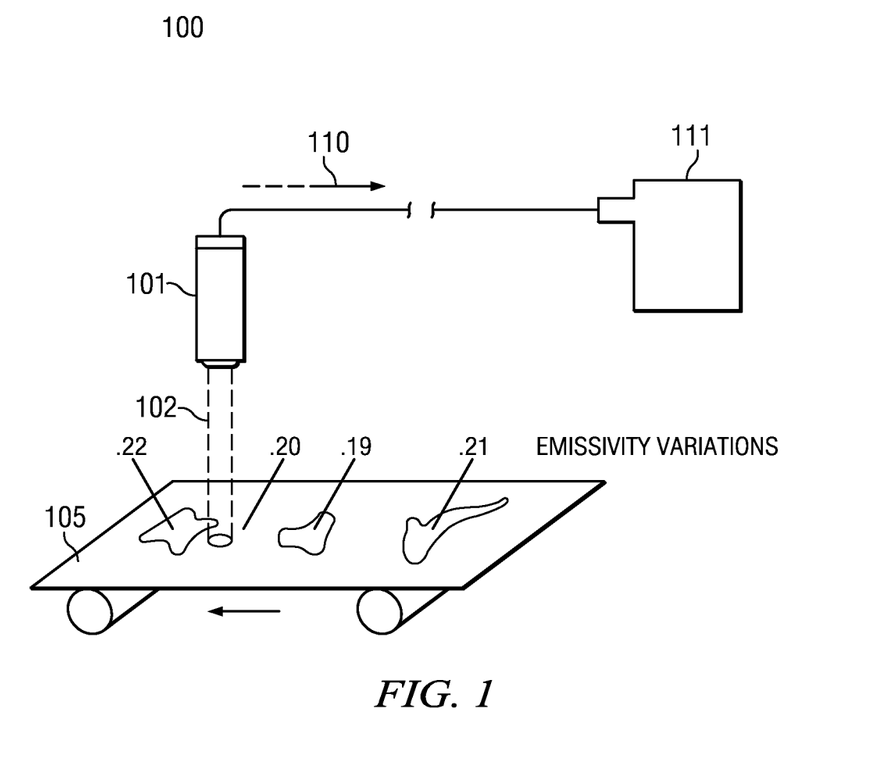
FIG. 1 is a high level overview of an application of an embodiment of the present invention dual waveband temperature detector.

FIG. 1 illustrates a typical industrial application 100 in which an example embodiment of the present invention can be used to detect and monitor temperature. A dual wavelength temperature detector 101 integrates the focused radiation of common optical axis 102 of a target material 105.

The target material 105 can have variations in emissivity. The target material 105 is shown with a low and variable emissivity ranging from 0.19 to 0.22. Such emissivity variations can be due to alloying, surface oxidation, variations in surface finish, and other factors.

The dual wavelength detector 101 outputs a signal 110 representative of the surface temperature of the target material 105 via an electrical connection to a machine user interface 111 where a user can monitor it. Electronics, such as amplifiers, A/D converters, and processors, can be located at the dual wavelength temperature detector 101 or machine user interface 111. The dual waveband temperature detector 101 can contain two sensors that share a common optical axis 102. The common optical axis 102 can result from the superimposition of the optical axes of both sensors.

Many applications, such as the example industrial application 100, benefit from the detection and monitoring of the temperature of a target 105. For example, the quality and through-put of many industrial processes, such as printing, laminating, extrusion, and metal forming, can be increased by monitoring and controlling temperature so that it is maintained at the optimal production level.

Figure 2A:
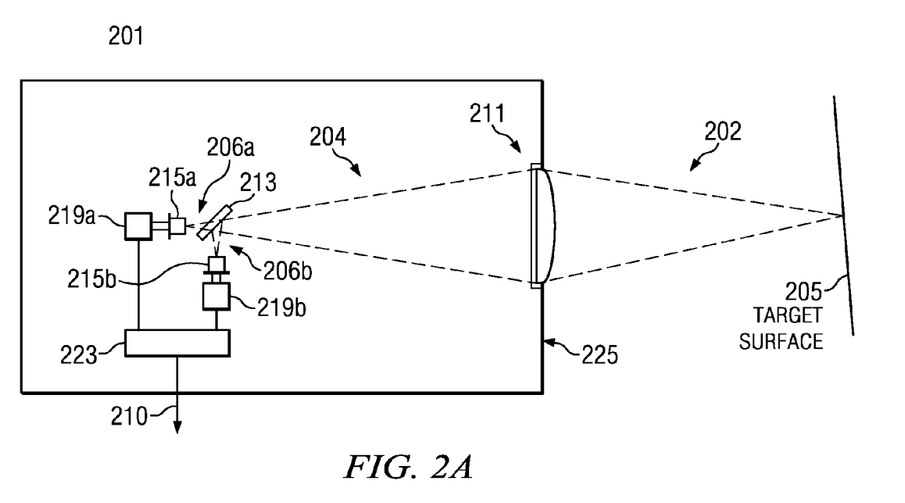
FIGS. 2A and 2B are high level schematic drawings of example embodiments of the dual-wave temperature detector.

FIG. 2A is a mechanical schematic diagram of an example embodiment of the dual waveband temperature detector 201. The depicted dual waveband temperature detector 201 is comprised of: a lens 211, beam splitter 213, integrating sensors 215a and 215b, front-end electronics 219a and 219b, processor 223, and enclosure 225. The external optical field 202 of the dual waveband temperature detector 201 is focused on a target surface 205 for which the temperature is to be detected. The lens 211 transfers the incident radiation within the external optical field 202 into the internal optical field 204, focusing it at the beam splitter 213.

The beam splitter 213 separates the focused incident radiation into two separate and distinct wavelength bands 206a and 206b. The beam splitter 213 is formed from a material, such as sapphire, with optical properties that enable two spectral bands of interest to be separated and individually transferred to sensors 215a and 215b. Here, separated wavelength bands 206a and 206b are each individually transferred to sensors 215a and 215b, respectively. For example, a first range of wavelengths 206a from about 0.5 μm to about 5 μm can be transferred to integrating sensor 215a, and a second range of wavelengths 206b greater than about 5 μm can be transferred to integrating sensor 215b.

Sensors 215a and 215b each respectively integrate the incident radiation of separated wavelength bands 206a and 206b, determining the radiance of each of the wavelength bands 206a and 206b. The output signals, such as a voltage representing a determined radiance, of sensors 215a and 215b are individually amplified by front-end electronics 219a and 219b, respectively. Each amplified determined radiance is provided as an input to processor 223.

Processor 223 can then determine the temperature T of the target surface 205 through a variety of methods, such as determining the radiance ratio of the input signals and utilizing an exponential or linear approach, and provide the temperature T as an output 210. Output 210 can be scaled electronically to render a number equal to the target temperature.

Alternatively, the radiance ratio value can be provided to a process controller, such as the Eurotherm 3500 series, which has the ability to convert the radiance ratio into a temperature by a polynomial approximation and display that temperature in digital form. A further alternative is to apply the two amplified signals to a microprocessor, such as the PIC16F87XA, to linearize the radiance ratio, as a function of temperature T, and obtain an output voltage equal to the target temperature.

Figure 2B:
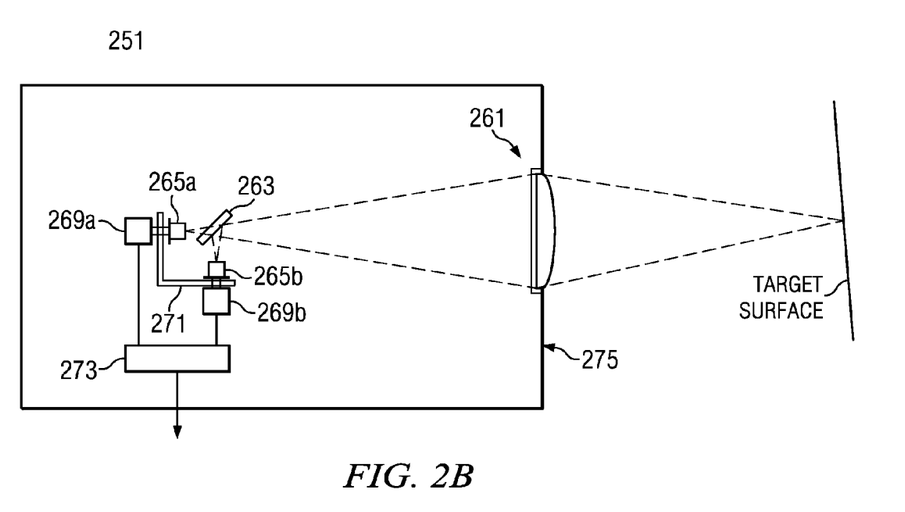

FIG. 2B illustrates a mechanical schematic diagram of an alternative example embodiment of the dual wavelength temperature detector 251. The depicted dual wavelength temperature detector 251 is comprised of: a lens 261, beam splitter 263, integrating sensors 265a and 265b, heat sink 271, front-end electronics 269a and 269b, processor 273, and enclosure 275. The heat sink 271 provides a common reference temperature for both integrating sensors 265a and 265b. Any thermal conductive material, such as aluminum, in which the integrating sensors can be configured to share a common reference temperature, can be used. Although the reference temperatures for integration sensors 215a and 214b (shown in FIG. 2A) are very likely to be the same, by providing a thermal conductive material on which to configure the two integrating sensors 265a and 265b, the heat sink 271 is able to better ensure that a common reference temperature is provided and, therefore, a more accurate radiance ratio.

Figure 3:
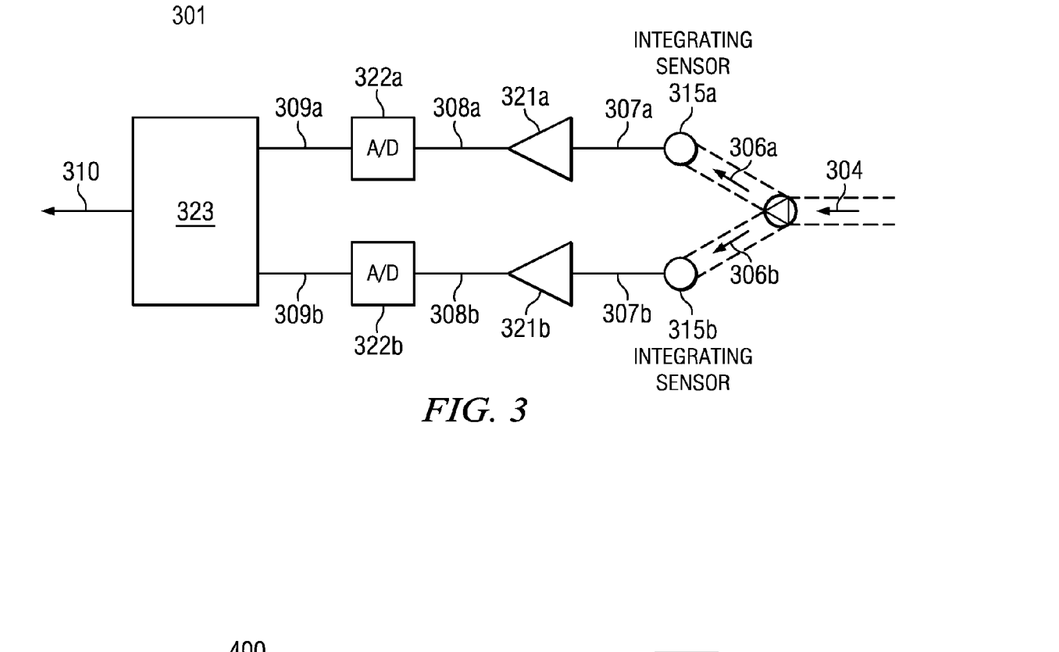
FIG. 3 is a high level schematic drawing of the circuitry of an example embodiment of a dual waveband temperature detector.

FIG. 3 depicts a top-level electrical schematic of an example embodiment of a dual waveband temperature detector 301. Incident radiation 304 is filtered into two separate and distinct wavelength bands 306a and 306b. The two incident radiation separated wavelength bands 306a and 306b are each individually directed to integrating sensors 315a and 315b, respectively. The integrating sensors 315a and 315b integrate the respective separated wavelength bands 306a and 306b of incident radiation 304 and each produce respective output signals 307a and 307b. Output signals 307a and 307b are each respectively amplified by amplifiers 321a and 321b to generate respective amplified signals 308a and 308b. Amplified signals 308a and 308b are each digitized by A/D converters 322a and 322b, respectively. A/D converters 322a and 322b produce respective digital signals 309a and 309b, which are provided as inputs to processor 323. Processor 323 can then use a variety of methods, such as determining the radiance ratio of the input signals and utilizing an exponential or linear approach, to determine the temperature T and provide a representative output 310.

Figure 4:
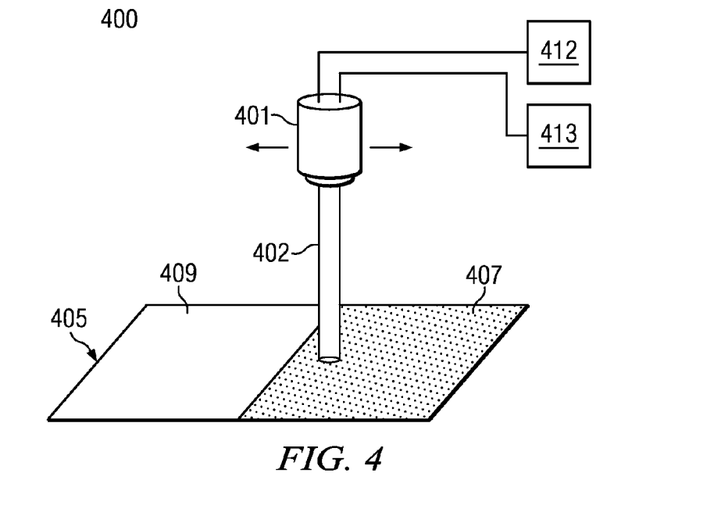
FIG. 4 is a high level diagram of a test setup used to test an example embodiment of a dual waveband temperature detector.

FIG. 4 illustrates an experimental test setup 400 of an embodiment of a dual waveband temperature detector 401. The dual waveband temperature detector 401 detects the temperature of a target 405. Incident radiation 402 is sensed and integrated by the dual waveband temperature detector 401. The target 405 is a plate of aluminum, of which one side is painted black 407 and the other side is unpainted 409, sitting on top of a hot-plate heater (not shown). The integrating sensors 215a and 215b (as shown in FIG. 2) of the dual waveband temperature detector 401 are each hooked up to a machine user interface 412 and 413, such as a digital liquid crystal display (LCD).

Experimental data can be measured and recorded for experimental test setup 400 and can include data at each sample temperature such as the hot-plate heater temperature (or the control temperature), first integrating sensor (S1) output signal for the incident radiation of painted 407 and unpainted 409 aluminum, second integrating sensor (S2) output signal for the incident radiation of painted 407 and unpainted 409 aluminum, and surface temperature readings of the painted 407 and unpainted 409 aluminum measured using an independent IR thermometer, such as a D501 handheld IR scanner from Exergen®. (Exergen is a registered trademark of Exergen Corporation, 400 Pleasant St. Watertown, Mass. 02472.) The dual waveband temperature detector 401 can be configured so that it can be moved back and forth to detect the temperature of the painted 407 and unpainted 409 aluminum at each control temperature.

Figure 5A:
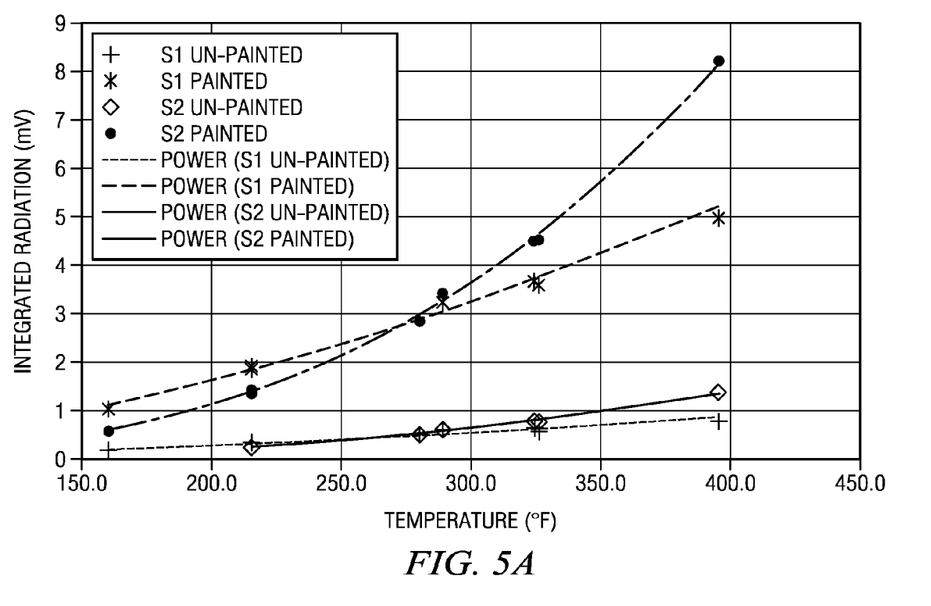
FIGS. 5A and 5B are measured test data of an example embodiment of a dual waveband temperature detector.
Figure 5B:
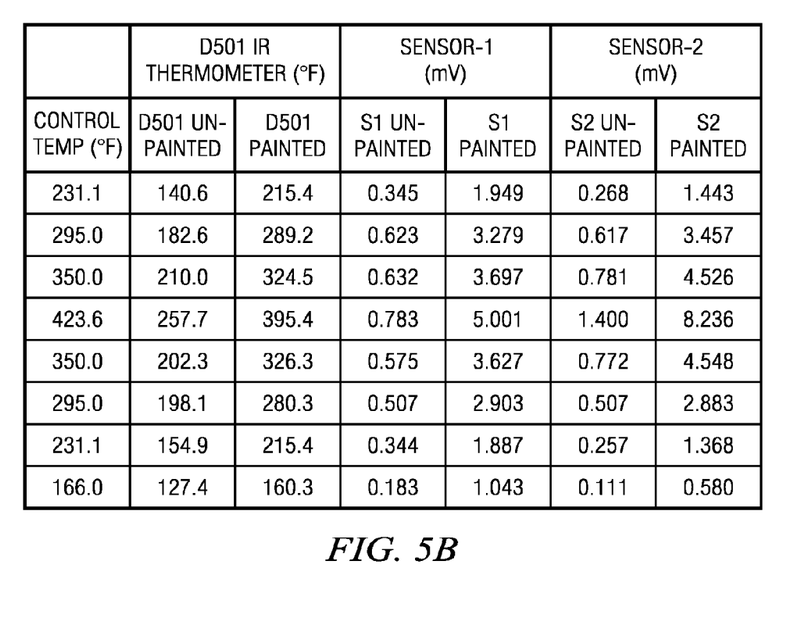

FIGS. 5A and 5B show example experimental data measured and recorded for experimental test setup 400 (FIG. 4).

FIG. 5A is a plot of experimental data measured and recorded for test setup 400 and includes trend lines. FIG. 5A includes the integrated radiation measured by first sensor (S1) for both painted 407 and unpainted 409 aluminum (shown in FIG. 4), and similarly, includes integrated radiation measured by second sensor (S2) for both painted 407 and unpainted 409 aluminum. Trend lines illustrate the power relationship between integrated radiation and temperature T, in which the integrated radiation is a direct function of temperature T raised to a power.

FIG. 5B is a table of example experimental data measured and recorded for test setup 400. The table includes measured data for: the hot-plate heater temperature, also called the control temperature (Control Temp. (° F.)); independent IR thermometer temperature readings of the unpainted 409 and painted 407 aluminum (D501 IR Thermometer (° F.)); first integrating sensor (S1) output signal for the integrated incident radiation of unpainted 409 and painted 407 aluminum in millivolts (SENSOR-1 (mV)); second integrating sensor (S2) output signal for the integrated incident radiation of unpainted 409 and painted 407 aluminum in millivolts (SENSOR-2 (mV)).

Figure 6A:
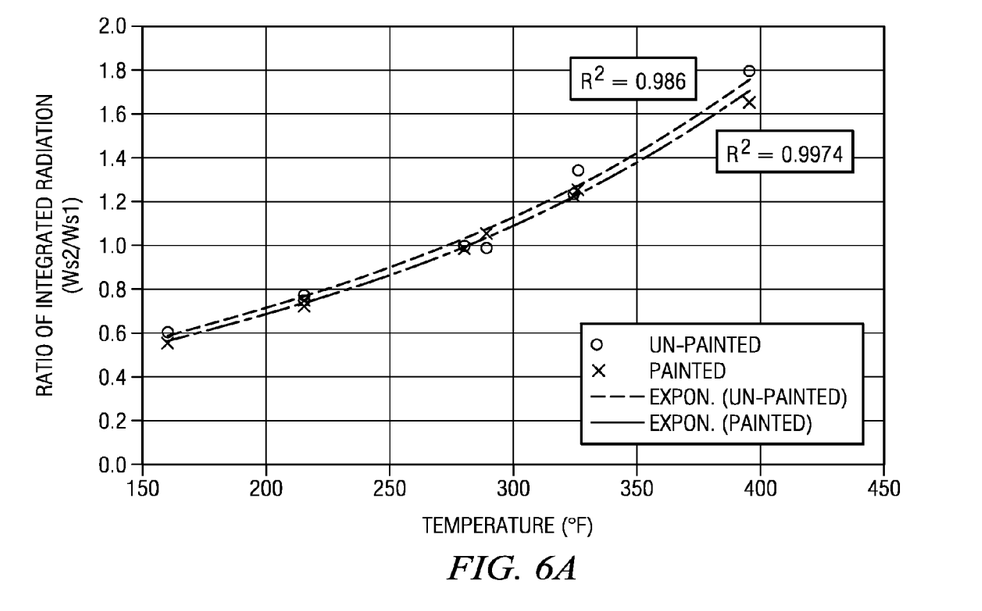
FIGS. 6A and 6B are radiance ratios computed from measured test data of an example embodiment of a dual waveband temperature detector.
Figure 6B:
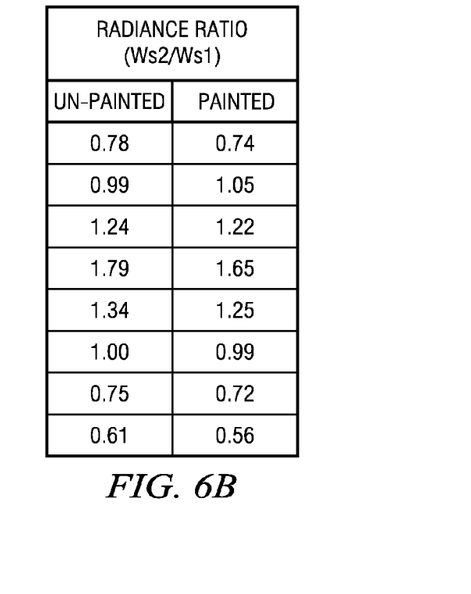

FIGS. 6A and 6B show the calculated radiance ratio for the example experimental data measured and recorded shown in FIG. 5B for experimental test setup 400 (FIG. 4).

FIG. 6A is a plot of the ratio of integrated radiation $W_{S2}/W_{S1}$ of the experimental data measured and recorded by integrating the second and first sensors (S2 and S1, respectively) for test setup 400 and includes trend lines. FIG. 6A includes the ratio of integrated radiation $W_{S2}/W_{S1}$ for both painted 407 and unpainted 409 aluminum (shown in FIG. 4). Trend lines illustrate the relationship between the radiance ratio and temperature T, in which radiance ratio is an exponential function of temperature T.

FIG. 6B is a table of the computed ratio of integrated radiation $W_{S2}/W_{S1}$ of the experimental data measured and recorded by integrating the second and first sensors (S2 and S1, respectively) for test setup 400. The ratio of integrated radiation is computed by taking the ratio of the radiation integrated by the second sensor (S2) by the radiation integrated by the first sensor (S1) for painted 407 and unpainted 409 aluminum for each sample temperature. In other words, for each sample of painted 407 and unpainted 409 aluminum at a control temperature, the voltage output of S2 is divided by the voltage output of S1.

Figure 7A:
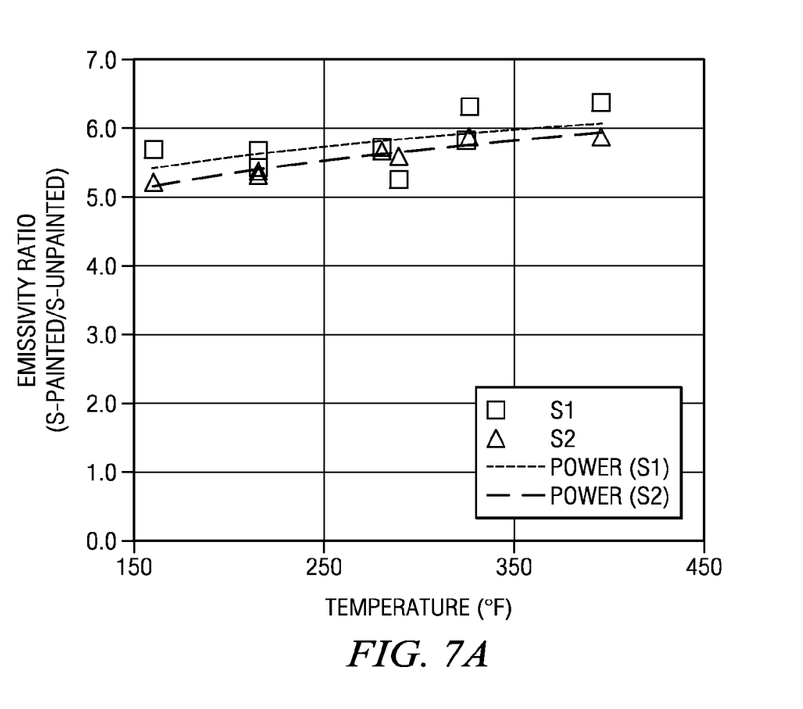
FIGS. 7A and 7B are emissivity ratios computed from measured test data of an example embodiment of a dual waveband temperature detector.

FIG. 7A is a plot of the emissivity ratio of the painted and unpainted aluminum calculated for each of the two integration sensors from the example experimental data measured and recorded shown in FIG. 5B for experimental test setup 400 (FIG. 4) and includes trend lines. The emissivity ratio is individually computed for each sensor by taking the ratio of radiances of the unpainted aluminum 409 and painted aluminum 407 (shown in FIG. 4) for each sample temperature. In other words, for each sensor at each control temperature sample, the voltage output resulting from integrating the radiance of the unpainted aluminum 409 is divided by the voltage output from integrating the radiance of the painted aluminum 407 that that individual sensor.

Figure 7B:
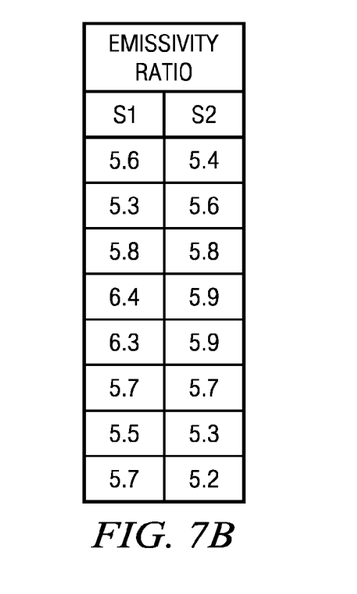

FIG. 7B is a table of the computed emissivity ratio of the painted and unpainted aluminum calculated for each integration sensor from the example experimental data measured and recorded shown in FIG. 5B for experimental test setup 400.

FIGS. 7A and 7B illustrate that variations in emissivity have a negligible impact on the overall emissivity $\epsilon_{\lambda,painted}$ of the painted 407 and $\epsilon_{\lambda,unpainted}$ unpainted 409 aluminum, and that there is a negligible impact on the emissivity ratio $\epsilon_{\lambda,2}/\epsilon_{\lambda,1}$.

Figure 8:
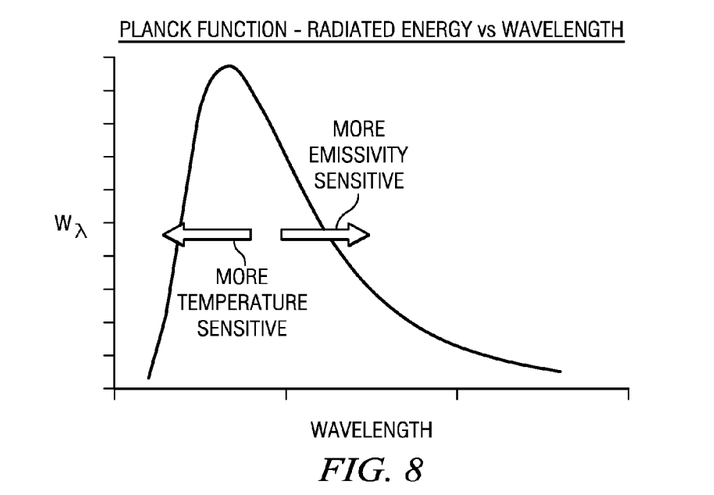
FIG. 8 is a plot of the Plank function of radiated energy as a function of wavelength; and or FIG. 9 is a plot of the optical transmission of a 1 millimeter thick plate of sapphire.

FIG. 8 illustrated the Planck function thermal radiation energy distribution as a function of wavelength. In general, radiance $W_\lambda$ is determined by integrating over the filter bandwidth of a pyrometer. For wide bandwidths, such as 0.1 to 5.0 µm and 6.5 to 20 µm, the Planck integral can be approximated by $W \approx \epsilon \sigma T^x$, where $x \neq 4$, FIG. 8 illustrates that for the wavelength band to the short wavelength side of the peak value of $W_\lambda$, $x > 4$. This is the side of the Planck function that is more temperature sensitive. Further, for bandwidths, such as 0.1 to 5.0 µm, employed at common temperatures for industrial use, the emitted energy increases more rapidly than $T^4$. Also shown in FIG. 8 is that for wavelength bands to the long wavelength side of the peak value of $W_\lambda$, $x < 4$. For the long wavelength side the emitted energy increases less rapidly than $T^4$.

Figure 9:
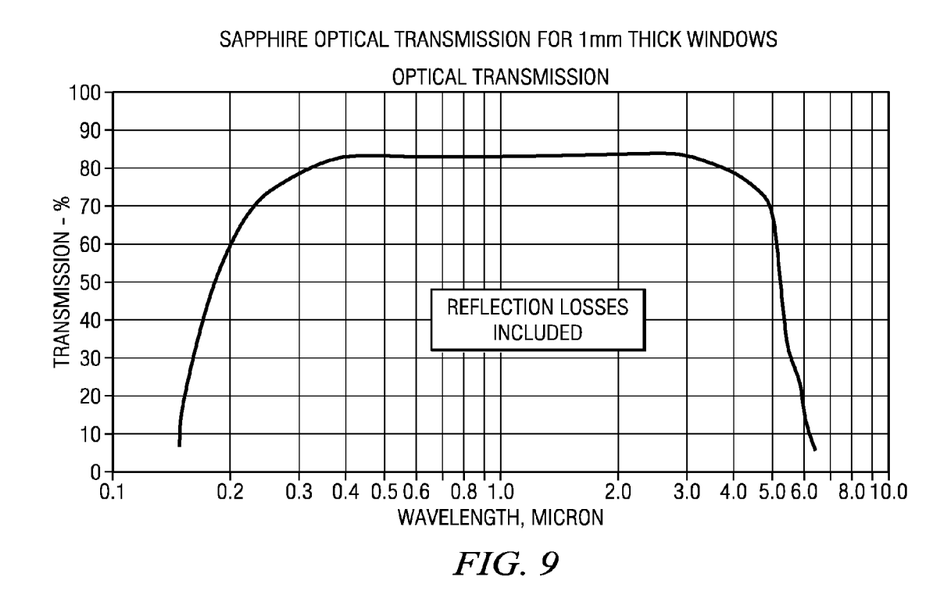

FIG. 9 shows the optical transmission properties of sapphire, which is a preferred beam splitter material. The use of a sapphire plate for a beam splitter exploits the optical properties of sapphire to separately send the two distinct spectral bands of interest to first and second integration sensors 215a and 215b (shown in FIG. 2A). FIG. 9 shows that sapphire's internal transmission is near 100% for wavelengths 0.1-5 µm. In other words, sapphire allows radiation of wavelengths 0.1-5 µm to pass through it, but reflects (or blocks) radiation of wavelengths greater than 5 µm.

In a preferred example embodiment, referring to FIG. 2A, integration sensor 215a uses a sapphire window in the front of its housing (TO-5 housing). The spectral reception of an integration sensor 215a with a sapphire window and transmission properties of sapphire beam splitter 213 are automatically matched. Therefore, integration sensor 215a receives radiation in the range 0.1-5 µm. Integration sensor 215b is configured with a coated silicon window in front of its housing (TO-5 housing) and receives radiation in the range 6.5-20 µm. Integration sensor 215b therefore detects most of the radiation which is reflected off sapphire plate beam splitter 213. It is not necessary to capture all of the energy reflected by the beam splitter at the long wave sensor, and, therefore, it is more practical and less expensive to employ a sensor with a waveband range of about 6.5-20 µm. There is negligible error created by allowing the energy of the waveband range of about 5-6.5 µm to escape detection.

Radiance $W_\lambda$ is determined at any wavelength λ, as a function of temperature T, by solving the Planck formula:

$$W_\lambda = \epsilon_\lambda c_1 * \lambda^{-5} (\exp[c_2/\lambda * T] - 1)^{-1}$$

Where all constants, including the physical constants, are in CGS units, $c_1 = 3.7413 \times 10^{-12}$ and $c_2 = 1.4388$. $\epsilon_\lambda$ is the emissivity as function of wavelength, which depends on surface composition and texture, and is also function of temperature T.

When the emissivity is constant at two different wavelengths, $\lambda_1$ and $\lambda_2$, the ratio of radiance, $W_{\lambda,2}/W_{\lambda,1}$, is a function of temperature T only. The assumption that emissivity is constant as a function of wavelength is usually called the "gray body" assumption. If the emissivity at the two wavelengths is not constant, then additional assumptions are required to determine temperature T from the radiance ratio $W_{\lambda,2}/W_{\lambda,1}$. An embodiment of the dual waveband temperature detector makes use of integrating sensors to overcome this problem.

In general, the radiances $W_{\lambda,1}$ and $W_{\lambda,2}$ are determined by integrating over the filter bandwidth of the pyrometer.

$$W_\lambda = \int_{\lambda_l}^{\lambda_u} \epsilon_\lambda W_\lambda \partial \lambda$$

Where $\lambda_u$ and $\lambda_l$ are the upper and lower band limits, respectively, of each sensor. It is assumed that the wavelength bands of the two sensors are non-overlapping.

A good approximation of the integral can be made by multiplying the radiance at the center wavelength of the filter band by the filter bandwidth $\partial\lambda$ for narrow band pyrometers, where the relative band width of the filter $\partial\lambda/\lambda$ typically ranges from 0.01 to 0.03. In fact, such an estimation method is used by many providers of narrow band two-color pyrometers that use micro-computers to calculate the temperature T from the ratio of radiances $W_{\lambda,2}/W_{\lambda,1}$.

However, for wide bandwidths, such as 0.1 to 5.0 µm and 6.5 to 20 µm, the estimate is invalid and the integral can be executed to determine the radiance for each of the two ratio pyrometer sensors. During the conversion of thermal energy to electrical energy, a thermopile executes the integration of the incident radiation over its bandwidth due to its relatively constant absorption of energy at all wavelengths. As such, a thermopile is a preferred sensor. If a microcomputer is used for data evaluation, the integrals can be executed via look-up tables.

Although the narrow wavelength band approximation for radiance is invalid for determining the radiance over wide bandwidths, a simplified approach to determining radiance exists. The simplified approach makes use of the Stefan-Boltzmann law that the total energy radiated from a surface is given as:

$$W = \epsilon \sigma T^4$$

Where the gray body assumption has been made ($\epsilon$=constant) and $\sigma$ is the Stefan-Boltzmann constant. This result is equal to the Planck function integrated over all wavelengths.

For wide bandwidths, such as 0.1 to 5.0 µm and 6.5 to 20 µm, the Planck integral can be approximated by $$W \neq \epsilon \sigma T^x, \text{ where } x \neq 4.$$

Further, if the wavelength band is to the short wavelength side of the peak value of $W_\lambda$, then x>4. As such, the emitted energy increases more rapidly than $T^4$. This is the case for bandwidths, such as 0.1 to 5.0 µm, employed at common temperatures for industrial use. For wavelength bands to the long wavelength side of the peak value of $W_\lambda$, then x<4. This means that the emitted energy increases less rapidly than $T^4$.

Therefore, taking the radiance ratio, and assuming constant emissivity, obtains the following:

$$W_{\lambda,2}/W_{\lambda,1} \neq (\epsilon_{\lambda,2}/\epsilon_{\lambda,1})T^{(x2-x1)} \neq T^{(x2-x1)}$$

Experimental data produced by an example embodiment of the present invention confirms the approximate power law of radiance ratio $W_{\lambda,2}/W_{\lambda,1}$ as a function of temperature T. Taking the logarithm of the radiance ratio approximates a straight line on a semi-log plot of the same data for small temperature ranges. Therefore, the radiance ratio can be linearly approximated for a narrow range of temperatures, for example, a range of 100 F. If plotted on log-log scale, with absolute temperature T in Kelvins (K.), the radiance ratio is a linear a function of temperature T with slope of approximately 1.7, which is the value of (x2-x1).

Compared to traditional and currently available ratio pyrometers, which measure the thermal radiance at two narrow wavelength bands and calculate the temperature from the ratio of these radiances, wide wavelength band ratio pyrometers offer several advantages, such as greater output stability with variations in emissivity, reduction in apparatus cost, improved accuracy for low temperature detection, and providing for easier and more reliable use.

By integrating (or by utilizing a sufficient estimation technique) the emissivity of a target material over a wide wavelength band, an example embodiment of the present invention provides greater output stability with respect to variations in emissivity. Greater stability is provided because those variations in emissivity at individual wavelengths, in general, will not affect the overall emissivity over the wide wavelength band. In other words, the wide wavelength band integration smoothes out the emissivity variations. Furthermore, because variations in emissivity have a negligible impact on the overall emissivities $\epsilon_{\lambda,2}$ and $\delta_{\lambda,1}$, there is also a negligible impact on the emissivity ratio $\epsilon_{\lambda,2}/\epsilon_{\lambda,1}$. Therefore, under these circumstances, the gray body assumption is not necessarily required to determine temperature T from the radiance ratio $W_{\lambda,2}/W_{\lambda,1}$.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A temperature detector for detecting the temperature of a target comprising:
    a beam splitter that receives radiation emitted from the target, primarily passes radiation of a first wavelength band and primarily reflects radiation of a second distinct wavelength band, one of the first and second wavelength bands being to a short wavelength side of a Planck function and the other of the first and second wavelength bands being to a long wavelength side of the Planck function;
    a first sensor that detects radiation passing through the beam splitter;
    a second sensor that detects radiation reflected by the beam splitter; and
    electronics that provide an output, based on a ratio of detected signals from the first and second detectors, representing the temperature of a target.

2. The temperature detector as claimed in claim 1 wherein the first and second wavelength bands are wideband.

3. The temperature detector as claimed in claim 2 wherein the electronics compute a ratio of the detected signals.

4. The temperature detector as claimed in claim 3 wherein the beam splitter and a window of the first sensor are formed of sapphire.

5. The temperature detector as claimed in claim 2 wherein the beam splitter is formed of sapphire.

6. The temperature detector as claimed in claim 2 wherein the first and second sensors are thermopiles.

7. The temperature detector as claimed in claim 6 further comprising a heat sink to which the first and second thermopiles are coupled.

8. The temperature detector as claimed in claim 2 wherein wavelengths of less than about 5 microns are primarily passed through the beam splitter and wavelengths of greater than about 5 microns are primarily reflected by the beam splitter.

9. The temperature detector as claimed in claim 2 wherein the one wavelength band contains a range of wavelengths from about 0.5 microns to about 5 microns and the other wavelength band contains a range of wavelengths greater than or equal to about 5 microns.

10. The temperature detector as claimed in claim 2 further comprising a lens that focuses the detected radiation.

11. The temperature detector as claimed in claim 1 wherein the electronics compute a ratio of the detected signals.

12. A method of detecting temperature of a target comprising:
receiving radiation emitted from the target;
splitting the received radiation by primarily passing a first wide wavelength band and primarily reflecting a second distinct wide wavelength band, using a beam splitter, one of the first and second wavelength bands being to a short wavelength side of a Planck function and the other of the first and second wavelength bands being to a long wavelength side of the Planck function;
sensing radiation passed through the beam splitter at a first sensor;
sensing radiation reflected by the beam splitter at a second sensor; and
providing a temperature output based a ratio of on the sensed signals from the first and second sensors, using electronics.

13. The method as recited in claim 12 wherein the first and second wavelength bands are wideband.

14. The method as recited in claim 13 wherein the electronics compute a ratio of the detected signals.

15. The method as recited in claim 14 wherein the beam splitter and a window of the first sensor are formed of sapphire.

16. The method as recited in claim 13 wherein the beam splitter is formed of sapphire.

17. The method as recited in claim 13 wherein the first and second sensors are thermopiles.

18. The method as recited in claim 17 further comprising coupling the first and second thermopiles to a heat sink.

19. The method as recited in claim 13 wherein wavelengths of less than about 5 microns are primarily passed through the beam splitter and wavelengths of greater than about 5 microns are primarily reflected by the beam splitter.

20. The method as recited in claim 13 wherein the one wavelength band contains a range of wavelengths from about 0.5 microns to about 5 microns and the other wavelength band contains a range of wavelengths greater than or equal to about 5 microns.

21. The method as recited in claim 13 further comprising focusing radiation to be detected using a lens.

22. The method as recited in claim 12 wherein the electronics computes a ratio of the detected signals.

23. A radiation detector comprising:
a first wideband integrating sensor that integrates a first wide wavelength band of radiation emitted from a target, the first wide wavelength band being from a short wavelength side of a Planck function and the first wideband integrating sensor absorbing energy over the first wide wavelength band and integrating incident radiation over its bandwidth;
a second wideband integrating sensor that integrates a second distinct wide wavelength band of radiation emitted from the target, the second wide wavelength band being from a long wavelength side of the Planck function and the second wideband integrating sensor absorbing energy over the second wide wavelength band and integrating incident radiation over its bandwidth; and
electronics that provide an output based on the ratio of integrated signals from the first and second wideband integrating sensors.

24. The radiation detector as claimed in claim 23 wherein the output based on the ratio of the integrated signals indicates the temperature of the target.

25. The radiation detector as claimed in claim 23 wherein the first wavelength band contains a range of wavelengths from about 0.5 microns to about 5 microns and the second wavelength band contains a range of wavelengths greater than about 5 microns.

26. The radiation detector as claimed in claim 23 further comprising a beam splitter that primarily passes radiation of the first wavelength band and primarily reflects radiation of the second wavelength band.

27. The radiation detector as claimed in claim 26 wherein the beam splitter is formed of sapphire.

28. The radiation detector as claimed in claim 27 wherein a window of the first sensor is formed of sapphire.

29. The radiation detector as claimed in claim 26 wherein wavelengths of less than about 5 microns are primarily passed through the beam splitter and wavelengths of greater than about 5 microns are primarily reflected by the beam splitter.

30. The radiation detector as claimed in claim 23 wherein the first and second integrating sensors are thermopiles.

31. The radiation detector as claimed in claim 30 further comprising a heat sink to which the first and second thermopiles are coupled.

32. A method of detecting radiation comprising:
at a first sensor, integrating a first wide wavelength band of sensed radiation emitted from a target, the first wide wavelength band being from a short wavelength side of a Planck function, the first sensor absorbing energy over the first wide wavelength band and integrating incident radiation over its bandwidth;
at a second sensor, integrating a second distinct wide wavelength band of sensed radiation emitted from the target, the second wide wavelength band being from a long wavelength side of the Planck function, the second sensor absorbing energy over the second wide wavelength band and integrating incident radiation over its bandwidth; and
providing an output based on the ratio of the integrated signals from the first and second wideband integrating sensors, using electronics.

33. The method as recited in claim 32 wherein the output based on the ratio of the integrated signals indicates the temperature of the target.

34. The method as recited in claim 32 wherein the first wavelength band contains a range of wavelengths from about 0.5 microns to about 5 microns and the second wavelength band contains a range of wavelengths greater than or equal to about 5 microns.

35. The method as recited in claim 32 further comprising splitting radiation by primarily passing radiation of the first wavelength band and primarily reflecting radiation of the second wavelength band, using a beam splitter prior to integrating at the first and second sensors.

36. The method as recited in claim 35 wherein wavelengths of less than about 5 microns are primarily passed through the beam splitter and wavelengths of greater than about 5 microns are primarily reflected by the beam splitter.

37. The method as recited in claim 35 wherein the beam splitter is formed of sapphire.

38. The method as recited in claim 37 wherein a window of the first sensor is formed of sapphire.

39. The method as recited in claim 32 wherein the first and second sensors are thermopiles.

40. The method as recited in claim 39 further comprising coupling the first and second thermopiles to a heat sink.

* * * * *